United States Patent
Wang

[19]

[11] Patent Number: 5,484,042
[45] Date of Patent: Jan. 16, 1996

[54] FLUID PRESSURE AND MECHANICAL DRUM BRAKE ACTUATOR

[75] Inventor: Nui Wang, Croydon, Australia

[73] Assignee: Brake And Clutch Industries Australia Pty, Ltd., East Bentleigh, Australia

[21] Appl. No.: 418,121

[22] Filed: Apr. 5, 1995

Related U.S. Application Data

[63] Continuation of Ser. No. 952,716, Feb. 4, 1993, abandoned.

[30] Foreign Application Priority Data

Apr. 4, 1991 [AU] Australia .................. PK5417

[51] Int. Cl.⁶ .................................... F16D 51/04
[52] U.S. Cl. .................. 188/106 A; 188/106 F; 188/146 BA; 188/363
[58] Field of Search ............ 188/106 A, 106 P, 188/106 R, 106 F, 146 BA, 363, 364, 78, 325, 250 C, 250 D, 362

[56] References Cited

U.S. PATENT DOCUMENTS

| | | | |
|---|---|---|---|
| 1,739,782 | 12/1929 | Christensen | 188/106 A |
| 1,743,412 | 1/1930 | Waite | 188/250 C |
| 2,125,266 | 8/1938 | Begg et al. | 188/152 |
| 2,166,157 | 7/1939 | Jones et al. | 188/106 A |
| 2,666,504 | 1/1954 | Bernd et al. | 188/106 A |
| 3,199,639 | 8/1965 | Newton | 188/106 A |
| 3,779,348 | 12/1973 | Farr | 188/79.62 |
| 3,811,539 | 5/1974 | Farr | 188/106 A |
| 3,913,710 | 10/1975 | Margetts | 188/79.62 |
| 4,374,554 | 2/1983 | Colpaert | 188/106 A |
| 4,503,949 | 3/1985 | Carré et al. | 188/196 BA |
| 4,729,457 | 3/1988 | Cousin et al. | 188/196 BA |
| 4,753,325 | 6/1988 | Jaksic | 188/106 F |

FOREIGN PATENT DOCUMENTS

| | | |
|---|---|---|
| 487802 | 6/1938 | United Kingdom . |
| 542713 | 1/1942 | United Kingdom . |
| 727627 | 4/1955 | United Kingdom . |
| 779793 | 7/1957 | United Kingdom . |
| 925593 | 5/1963 | United Kingdom . |

*Primary Examiner*—Matthew C. Graham
*Attorney, Agent, or Firm*—Oliff & Berridge

[57] ABSTRACT

The invention is drum brake assembly having a dual brake actuator. A piston-cylinder assembly forms the primary brake actuator, and a lever member, together with the piston-cylinder assembly, forms a composite structure which acts as a secondary brake actuator. The lever member pivots about an axis substantially parallel to the axis of rotation of the drum, and the lever member is contained within the drum brake assembly. The piston-cylinder assembly is operable independent of the composite structure to actuate the brake.

20 Claims, 3 Drawing Sheets

5,484,042

FLUID PRESSURE AND MECHANICAL DRUM BRAKE ACTUATOR

This is a Continuation of application Ser. No. 07/952,716 filed Feb. 4, 1993, now abandoned.

BACKGROUND OF THE INVENTION

This invention relates to an actuator for the brake shoe of a drum brake. The invention will be particularly described with reference to a drum brake of a leading-trailing configuration, having a substantially circular single shoe. It is to be understood however, that the invention is also applicable to drum brakes having different shoe configurations.

In the manufacture of brakes for motor vehicles and the like there is a need to have brake assemblies which utilise a low number of parts. Assemblies of this nature are advantageous for various reasons including a decreased chance of assembly failure, and a decrease in the time required to assemble the brake. There is also generally an associated decrease in cost of the assembly. Hydraulic brakes of this type have usually employed at least one piston/cylinder assembly which has two pistons movable in opposite directions within the cylinder, and the pistons are arranged to contact opposite ends of the brake shoe assembly. This arrangement requires separate seals for each of the two pistons thereby adding further to the number of components required for the total assembly. Single piston assemblies have been used in the past but have been considered not satisfactory because of the need for the piston/cylinder assembly to slide relative to the back plate on which the brake assembly is mounted. The sliding interfaces are a major source of problem due to the possibility of corrosion and seizure taking place.

Drum brake assemblies which include both service and park brake actuating mechanisms generally involve use of a park brake lever which is mechanically operable independently of a hydraulic service brake system. Prior arrangements of that kind have suffered from various problems. In one such prior arrangement, the park brake lever extends through the back plate for operation outside of the brake assembly in a plane which is generally parallel to the rotational axis of the brake drum. That arrangement, known as a cross-pull lever, has the disadvantage that the lever must pass through the back plate and must thus be separately sealed or booted at the location where it passes through the back plate to avoid the ingress of dirt into the brake assembly. The provision of the boot seal adds to the number of parts for the brake assembly. In another arrangement, known as an in-plane lever, the park brake lever operates in a plane generally transverse to the rotational axis of the drum. A problem with that arrangement is that the actuation points on the brake shoe for the park brake mechanism need to be separate from the actuation points for the service brake. That arrangement adds to the number of parts for the mechanism. Also, provision of separate actuation points is not practicable for some brake shoe configurations, particularly single piece shoe brakes having a channel shaped shoe body.

It is a requirement of modern brake assemblies that the mechanism is automatically adjustable to compensate for pad wear in use. It is a further requirement that the automatic adjustment mechanism is capable of operating as a result of service brake use, irrespective of whether the park brake is used. The mechanism should also be relatively simple and fail safe.

SUMMARY OF THE INVENTION

It is an object of the present invention to provide an improved form of drum brake actuating mechanism which is of relatively simple form and involves the use of a relatively small number of components. It is a further object of the invention in a preferred form to provide a mechanism which is usable with a single piece brake shoe and which overcomes, or at least minimizes, at least some of the aforementioned problems. A further object of the invention in a preferred form is to provide such a mechanism having a single piston hydraulic actuating mechanism. Yet another object of the invention in a preferred form is to provide such a mechanism having a simple yet effective automatic adjustment means.

According to one aspect of the present invention, there is provided a drum brake actuating mechanism including, a piston-cylinder assembly which forms part of a primary brake actuator, a member which forms part of a secondary brake actuator and is connected to said assembly for relative movement about a pivot axis extending transverse to the longitudinal axis of that assembly, reaction means which forms part of said member and is spaced from said pivot axis in a direction transverse to that axis, and said assembly and said member cooperate to form a composite structure which is positionable between two opposed and spaced abutments of a brake shoe so that said reaction means coacts with one said abutment, and said assembly coacts with the other said abutment, wherein said composite structure is operable to increase the spacing between said abutments and thereby cause radial expansion of the brake shoe when said member is moved in one direction about said pivotal axis, and said assembly is operable independent of said composite structure to cause said radial expansion.

According to another aspect of the invention, there is provided a drum brake actuating mechanism including, a piston-cylinder assembly which forms part of a primary brake actuator, a member which forms part of a secondary brake actuator and is connected to said assembly for relative movement about a pivot axis extending transverse to the longitudinal axis of that assembly, reaction means which forms part of said member and is spaced from said pivot axis in a direction transverse to that axis, and said assembly and said member cooperate to form a composite structure which is positionable between two opposed and spaced abutments of a brake shoe so that said assembly coacts with one of said abutments and is coactable with the other of said abutments and said reaction means coacts with said other abutment, wherein said primary actuator is operable to cause said assembly to coact with both said abutments and extend axially so as to thereby increase the spacing between said abutments and cause the brake shoe to expand radially into engagement with a brake drum, and said secondary actuator is operable to move said member in one direction about said pivotal axis and thereby push said reaction means against said one abutment and push said assembly against the other said abutment such as to cause said increase in spacing.

The reference in the foregoing statements to coaction with an abutment is to be understood as embracing situations in which the coaction is not direct. That is, coaction with the abutment may occur through an intermediary member or element.

In a preferred form of the invention, the piston-cylinder assembly is hydraulically operated and forms part of the service brake actuator. For that purpose, the influence which the piston-cylinder assembly has on expansion and contraction of the brake shoe, may be quite independent of the similar influence imposed through pivotal movement of the secondary actuator member. That is, opposite ends of the piston-cylinder assembly may coact with respective abutments of the shoe for service brake operation, whereas only one end of that assembly may coact with an abutment for park brake operation. In that regard, the primary actuator referred to above will generally be the service brake actuator, and the secondary actuator will be the park brake actuator.

It is further preferred that the secondary actuator member is a lever which is movable in a plane substantially transverse to the rotational axis of the associated brake drum. The aforementioned reaction means may be at one end portion of that lever, and a cable or other force transmitting means may be connected to the opposite end portion of the lever. The pivotal connection with the piston-cylinder assembly is located between those end portions, and may be a fulcrum-type arrangement.

BRIEF DESCRIPTION OF THE DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings.

DETAILED DESCRIPTION OF PREFERRED EMBODIMENTS

Figure 1:
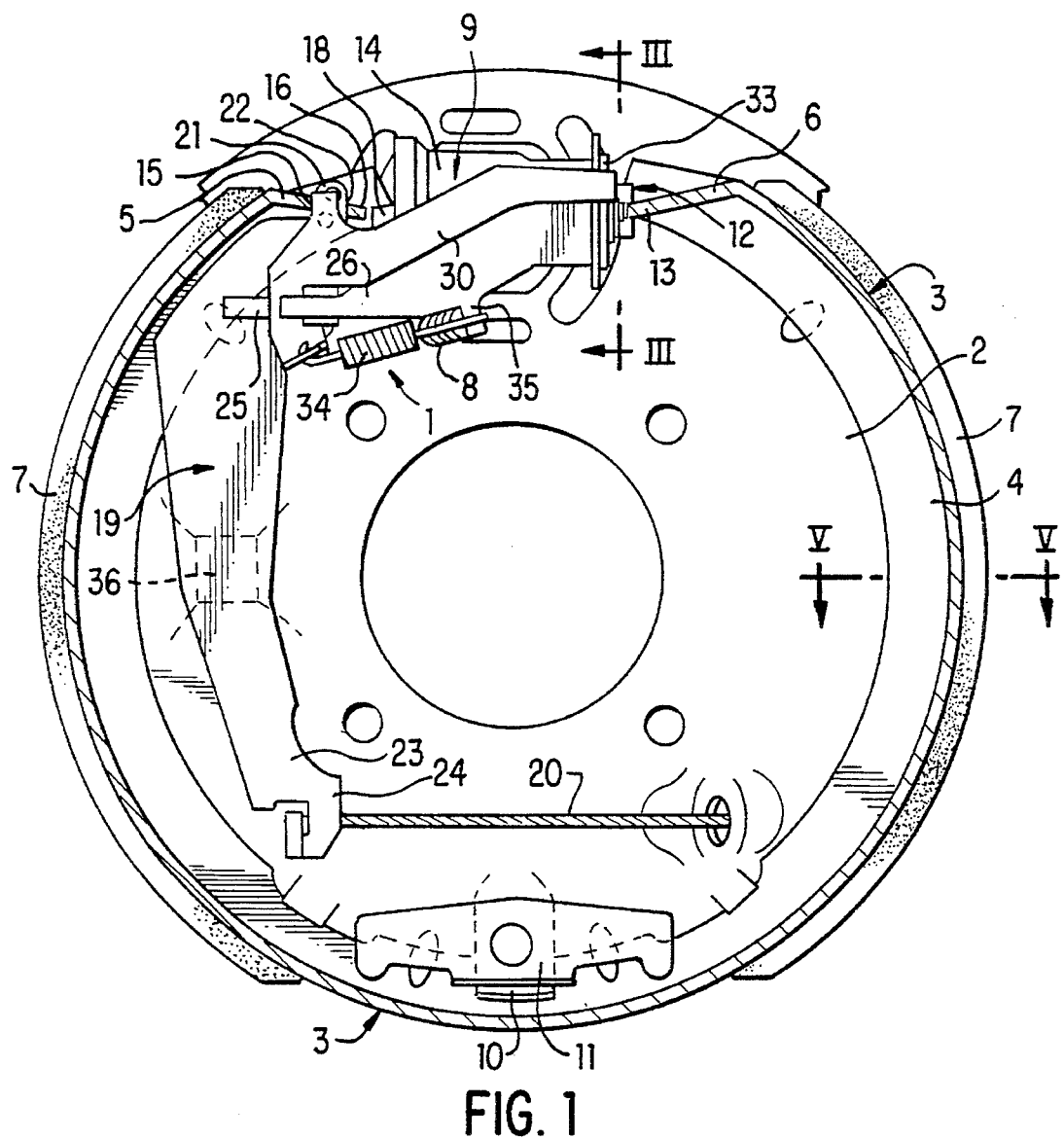
FIG. 1 is a partially sectioned end view of part of a brake assembly to which actuating mechanism according to one embodiment of the invention has been applied.

In the arrangement shown in FIG. 1, the drum brake actuating mechanism 1 is mounted on a back plate 2 which is in turn fixed to a motor vehicle (not shown) so as to be fixed relative to the rotatable brake drum (not shown). The brake shoe 3 is preferably of substantially circular form as shown and is held to the back plate 2 at diametrically opposite positions. The body 4 of the brake shoe has opposed and spaced ends 5 and 6 between which the actuating mechanism 1 is located. That mechanism 1 is operable to urge the ends 5 and 6 apart so as to bring the friction material 7 on the radially outer surface of the shoe body 4 into contact with an opposed inner surface of the brake drum. The shoe ends 5 and 6 may be held against the back plate 2 by any suitable means such as a bias spring 8 acting between the back plate 2 and a floatingly supported piston-cylinder assembly 9. The side of the brake shoe 3 diametrically opposite to the actuating mechanism 1 may be connected to an abutment block 10 which reacts the braking torque, and that side may be held against the backplate 2 by any suitable means such as a spring clip 11.

The actuating mechanism 1 includes the piston-cylinder assembly 9 which is arranged with its longitudinal axis extending between the ends 5 and 6 of the brake shoe 3. The mechanism 1 is preferably provided with an automatic adjuster which may include a screw threaded stud 12 arranged to contact an abutment 13 which forms the terminus of the shoe end 6. The stud 12 is located at one end of the piston-cylinder assembly 9, and is connected to the cylinder body 14 of that assembly 9 as hereinafter described. The opposite end of the assembly 9 is arranged, in the arrangement shown, to coact indirectly with an abutment 15 which is provided at the shoe end 5. That indirect coaction is effected through an extension 16 of the shoe end 5.

Figure 6:
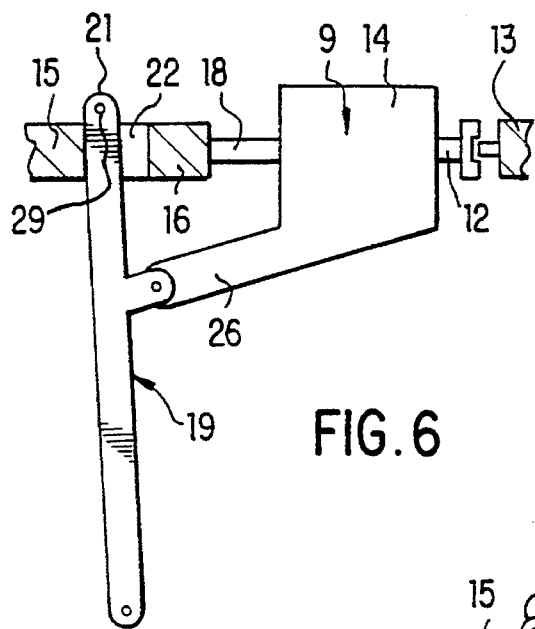
FIGS. 6, 7 and 8 are diagrammatic representations indicating the manner of operation of the actuating mechanism according to the invention.
Figure 7:
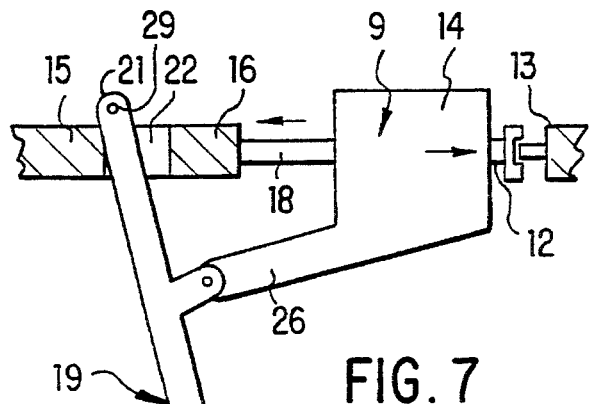

When the brake is operated in the service brake mode, fluid under pressure is urged into the cylinder body 14 so as to cause the piston 17 of the assembly 9 to move towards the extension 16. That movement causes a piston rod 18 to press against the extension 16 and thereby urge the ends 5 and 6 of the brake shoe 3 apart. That action is illustrated diagrammatically in FIG. 7, which should be compared with FIG. 6 to appreciate the increase in spacing between the shoe ends 5 and 6. The piston rod 18 and the adjustment stud 12 may be each provided with notched recesses within which the extension 16 and the abutment 13 respectively locate. The assembly 9 is thereby supported by the shoe ends 5 and 6 without contacting the backing plate 2.

The actuating mechanism 1 includes a secondary actuator member, which is formed by a lever 19 in the arrangement shown, and that lever is operable independently of the piston-cylinder assembly 9. The lever 19 is preferably operated by mechanical linkages including a pull cable 20, and will remain operative in the event of failure of the assembly 9 or the associated hydraulic system. In the arrangement shown, one end 21 of the lever 19 locates in a slot 22 formed in the shoe end extension 16. The opposite end 23 of the lever 19 is provided with a hook 24 around which the pull cable 20 locates for the purpose of operating the lever 19. The lever end 21 constitutes reaction means which coacts with the shoe abutment 15.

Figure 2:
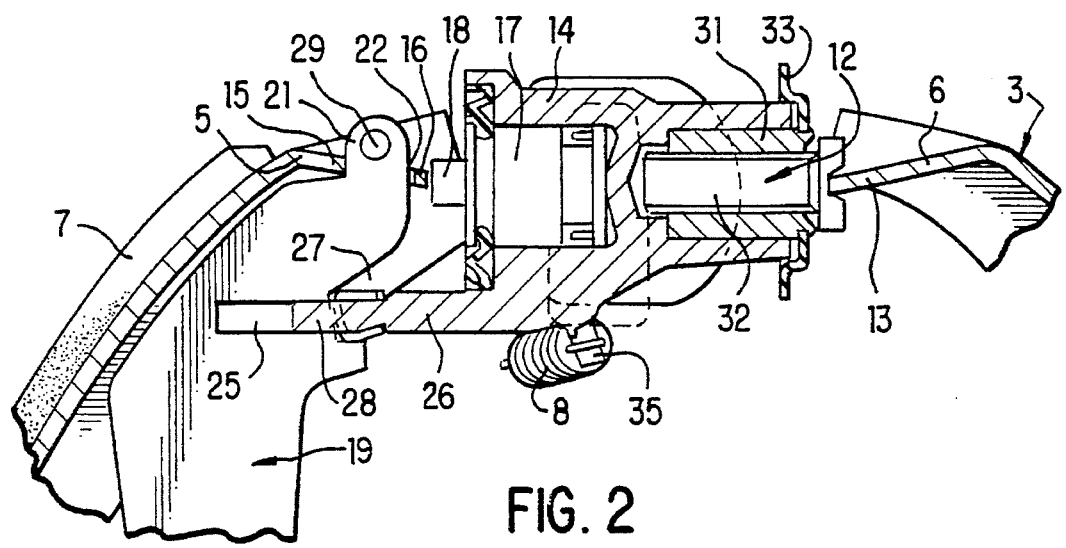
FIG. 2 is a view of the upper portion of the assembly shown in FIG. 1, and showing the piston-cylinder assembly in cross-section for convenience of illustration.

The lever 19 is pivotally connected to the assembly 9 at a location between the lever ends 21 and 23. In the arrangement shown, the connection is something in the form of a fulcrum connection. As best seen in FIG. 2, the lever 19 is received between two laterally spaced arms 25 of a member 26 which is attached to or formed integral with the cylinder body 14. A recess 27 (FIG. 2) formed in the edge of the lever 19 receives part of the member 26, and the base of that recess 27 engages a fulcrum edge 28 (FIG. 2) of the member 26 so as to form the pivotal connection. It will be apparent that the lever 19 and the member 26 are kept in appropriate relationship by the configuration described. Furthermore, the arrangement is such that the lever 19 moves relative to the member 26 about a pivot axis which extends transverse to the longitudinal axis of the assembly 9 and generally parallel to the rotational axis of the associated brake drum.

Figure 8:
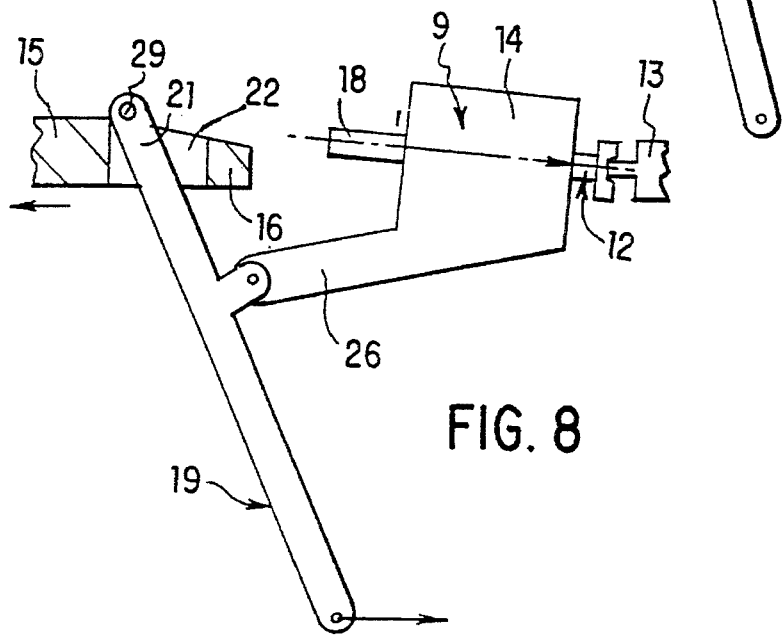

When the brake is operated in the park brake mode, the lever 19 is caused to pivot relative to the member 26 as shown diagrammatically in FIG. 8. As a consequence the reaction means 21 presses against the abutment 15 and the assembly 9 is moved in the opposite direction to press against the abutment 13. That opposite movement results from the reaction occurring at the fulcrum edge 28. The lever 19 and the assembly 9 therefore combine to form a composite structure through which brake applying force is reacted into the two shoe ends 5 and 6. In particular, the lever 19 acts directly on one end 5 and acts indirectly on the other end 6 through the assembly 9.

The lever end or reaction means 21 may be retained in the slot 22 by any suitable means. By way of example, that retention may be achieved or assisted by a half shear projection 29 (FIG. 2) which extends laterally from a side of the lever 19. Displacement of the lever may be further hindered by locating part of a pawl 30 in the slot 22 so as to act as a "key".

As shown, the lever 19 preferably operates in the plane of the brake shoe expansion, i.e., transverse to the axis of rotation of the brake drum. Such an arrangement has various advantages. Firstly, the lever 19 does not need to pass through the back plate 2 as is required with cross-pull type park brake levers, and thus does not need to be separately booted as is required by cross-pull type levers. Secondly, an automatic adjustment facility of relatively simple operation can be adopted.

Several advantages result from utilising the cylinder body 14 as one of the components in the chain of components through which the brake is operated in the park brake mode. An important advantage is that the brake shoe abutments utilised during the service brake mode are also utilised during the park brake mode. Thus, only a single abutment is required at one end of the brake shoe, and a single abutment with an extension is provided at the other end. Thus, a relatively simple abutment arrangement is provided for the brake actuating mechanism.

As previously mentioned, the present invention is particularly suitable for use with a substantially circular type single piece brake shoe. That type of brake shoe has many advantages including a reduced number of components. It also has inherent resilience which facilitates retraction from a brake-on position to a brake-off position without the need for separate retraction springs. In a preferred form, the body 4 of the brake shoe is formed from a channel-shaped or U-shaped metal section. Provision of abutments on a U-shaped metal section is not always convenient, and generally requires additional welding or machining. In the preferred arrangement shown, that problem has been avoided by inward folding of the channel web or base at the ends 5 and 6 so as to form the abutments.

The mechanism 1 is preferably provided with an automatic adjuster, and that adjuster can be of any suitable form. One satisfactory automatic adjuster is shown in the drawings. That adjuster comprises a sleeve 31 (FIG. 2) located in the cylinder body 14 so as to be relatively rotatable about the axis of that body, and having a threaded bore which is in cooperative engagement with the threaded shank 32 of the stud 12. A ratchet or toothed wheel 33 is fixed to the sleeve 31 so as to rotate with the sleeve 31. The adjuster also includes the pawl 30 which is pivotally connected to the upper end of the lever 19 and is also connected to the cylinder body 14. The pawl 30 is biased against the ratchet wheel 33 by means of a tension spring 34 (FIG. 1).

When the actuating mechanism 1 is operated either in the service brake mode or the park brake mode, and there is excessive separation of the two shoe ends 5 and 6, the pawl 30 will pivot relative to the ratchet wheel 33, without losing engagement with the teeth around the periphery of the ratchet wheel 33. When the brake is released, the pawl 30 swings back towards its original disposition and in so doing causes the ratchet wheel 33 to rotate. The sleeve 31 is thereby rotated relative to the stud 12, and because of the threaded engagement between those two members the stud 12 is caused to move axially outwards of the sleeve 31. In the result, the effective length of the assembly 9 is increased and the brake released to brake engaged travel of the shoe 3 is thereby maintained substantially constant as the lining 7 wears.

It is relevant to the foregoing that the spring 34 acts between the pawl 30 and the cylinder body 14 in such a way as to urge the pawl 30 in a suitable direction of rotation. In that regard, the pawl 30 is able to swing to a limited extent about a pivot formed at or adjacent the lever end 21. As previously stated, part of the pawl 30 is located in the slot 22.

The upper end of the brake shoe 3 is held to the back plate 2 by means of the tension spring 8 which connects the cylinder body 14 to the back plate 2. In the arrangement shown, the tension spring 8 is attached to a lug 35 projecting laterally from the side of the cylinder body 14 adjacent the rotational axis of the brake drum. That attachment is such that there is a tendency for the cylinder body 14 to rotate about its axis in the direction of the force provided by the tension spring 8. The lever 19 bears against a raised platform 36 (FIG. 1) formed on the back plate 2 and thereby limits the extent to which the cylinder body 14 can rotate. The spring 8 therefore serves to hold the upper end of the brake shoe 3 against the back plate 2 and also serves to hold the lever 19 in position against the back plate 2. That arrangement ensures that the lever 19 does not rattle or move about in an untoward manner during use of the vehicle.

The above described spring 8 is an example only. Other forms of bias springs located elsewhere performing similar functions are also suitable.

Figure 3:
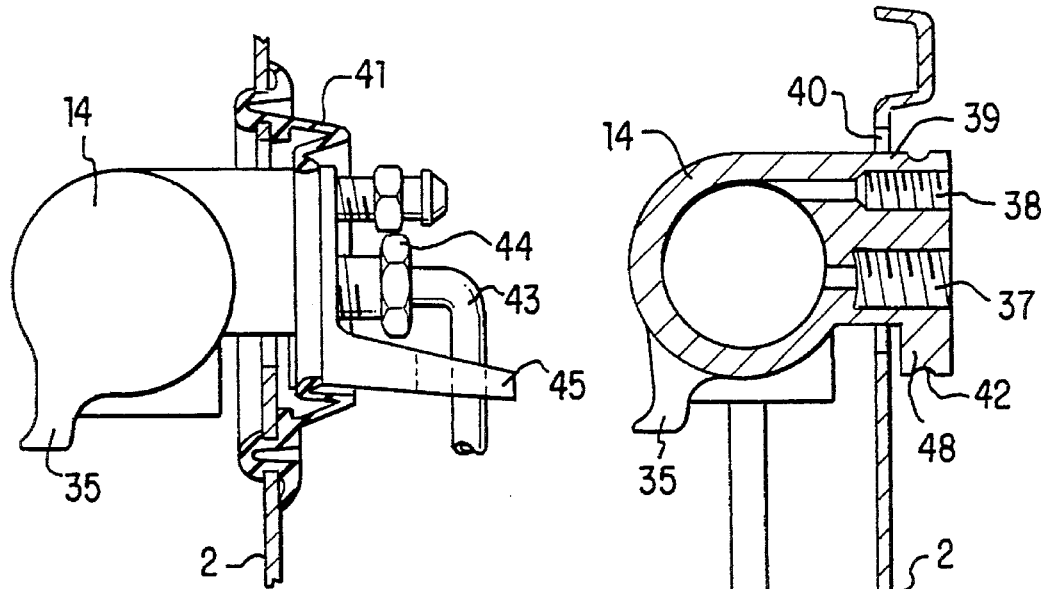
FIG. 3 is a view taken along line III—III of FIG. 1, but omitting parts for convenience of illustration.
Figure 4:
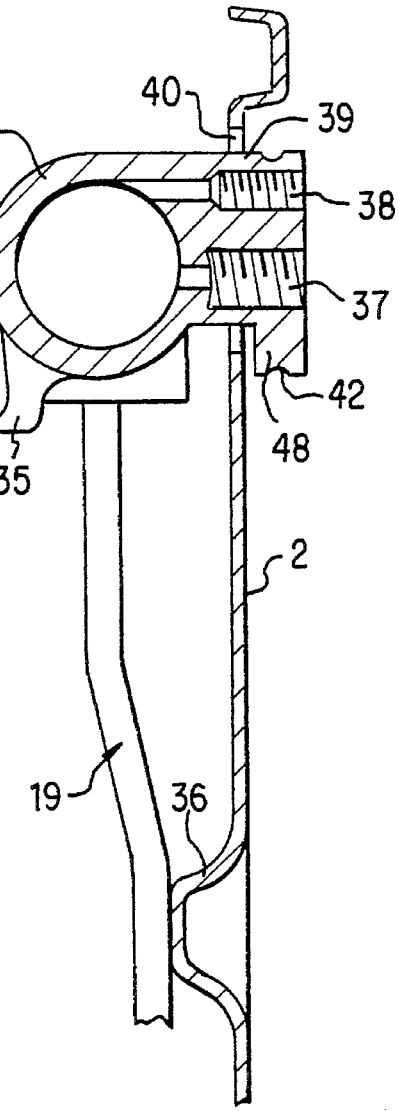
FIG. 4 is a view similar to FIG. 3 but showing the cylinder body of the piston-cylinder assembly in cross-section, and in which certain parts are omitted for convenience of illustration.

As best seen in FIG. 4 of the drawings, the cylinder body 14 is provided with an inlet opening 37 through which fluid under pressure is supplied to the interior of the cylinder. An outlet opening 38 for a bleed outlet from the cylinder is also provided, and both inlet and outlet are located on a section 39 of the cylinder body 14 which projects through an opening 40 in the back plate 2. A rubber boot 41 (FIG. 3) is provided around the cylinder body 14 and locates in a groove 42 (FIG. 4) formed in the cylinder body 14. The boot 41 connects to the back plate 2 through a series of slots formed around the opening 40, and the boot 41 at least substantially prevents the ingress of dirt into the brake assembly at that location. The high pressure fluid to the cylinder is preferably supplied through a flexible hose or a metal pipe 43 (FIG. 3) which is connected to the inlet by means of a union nut 44. In the latter case, it is preferred that the pipe 43 is received between a pair of locating fingers 45 (FIG. 3) provided on the cylinder body 14 so as to support the supply pipe 43 and prevent it from twisting during tightening of the nut 44.

In the event that it is required to remove the brake drum from the vehicle, it may be necessary to first reduce the effective length of the piston-cylinder assembly 9 by screwing the stud 12 inwards. That may be achieved by removing the boot 41 from the back plate 2 and thereby making it possible to disengage the pawl 30 from the ratchet wheel 33 and thereby permitting the ratchet wheel 33 to be rotated in the reverse direction to decrease the effective length of the assembly 9.

Figure 5:
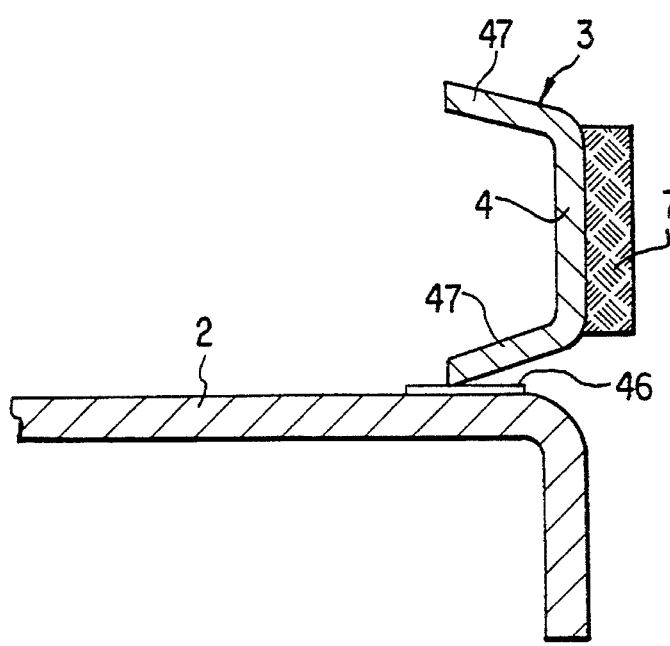
FIG. 5 is a cross-sectional view taken along line V—V of FIG. 1.

It will be appreciated that because the hydraulic system utilises only a single piston the cylinder body 14 must be capable of moving relative to the back plate 2 during application of the brakes as well as throughout the life of the lining 7. The opening 40 through the back plate 2 must therefore be sufficiently large to accommodate such movement. However, it is preferred that the cylinder body 14 does not actually touch the back plate 2 directly. In the arrangement shown, that objective is achieved by having the brake shoe 3 slide on specially raised radially aligned platforms 46 (FIG. 5) pressed out of the back plate 2. When the brake shoe 3 is formed of a U-shaped cross-sectional material, it is preferred that the flanges 47 (FIG. 5) are slightly splayed so that the contact surface of the brake shoe 3 on the back plate platforms 46 is radially inwards from the outer edge of the back plate 2.

Since the cylinder body 14 does not contact the back plate 2, there will be relatively little possibility of the cylinder body 14 jamming against the back plate 2. In the past, such jamming has proved to be a problem in brakes of the type having sliding contact between the cylinder body and the back plate. In order to ensure that the upper side of the brake assembly does not inadvertently lift free of the back plate 2, it is preferred that the cylinder body 14 is provided with a lip 48 (FIG. 4) which locates behind the edge of the opening 40 through the back plate 2. That lip 48 contacts the back surface of the back plate 2 in the event of the brake assembly lifting up from the back plate, but otherwise there will not be contact between the lip 48 and the back plate 2.

The present invention provides various advantages other than those described above. In particular, since the simplified abutment arrangement does not require special levers or additional abutment points, the space radially inwards of the brake shoe 3 is relatively free of brake components. The additional space thereby provided within the brake assembly can be utilised by, for example, apparatus required for an anti-lock braking system or the like. The reduced number of components will also decrease the overall cost of the assembly as well as simplifying assembly and decreasing assembly time.

Various modifications, additions or alterations may be made to the arrangement and construction of components as described herein without departing from the spirit or ambit of the invention as defined by the appended claims. Furthermore, relative terms such as "left hand" and "right hand" which are used in the specification, are not intended to restrict the invention to the particular arrangement shown. Such terms have been used simply to aid description of the invention and other configurations are clearly possible.

I claim:

1. A drum brake assembly, comprising:

a backing plate;

a brake shoe attached to the backing plate and having two opposed and spaced ends, a first abutment at one end of the brake shoe and a second abutment at the other end of the brake shoe;

a primary brake actuator comprising a piston-cylinder assembly that is movably supported on the two ends of the brake shoe so that the piston-cylinder assembly may move relative to said backing plate;

a secondary brake actuator comprising a member substantially fully contained in the brake assembly, said member having reaction means for coacting with said first abutment at an end portion thereof; and means for connecting said member to said piston cylinder assembly for relative movement about a pivot axis extending substantially parallel to the rotational axis of the brake drum, said pivot axis being spaced from said reaction means in a direction transverse to said pivot axis;

wherein in a first mode of operation of said brake assembly said piston-cylinder assembly and said member cooperate to form a composite structure, said reaction means coacting with the first abutment, and said piston-cylinder assembly coacting with the second abutment so that said composite structure is operable to increase the spacing between said first and second abutments to cause radial expansion of the brake shoe when said member is moved in a first direction about said pivot axis; and wherein in a second mode of operation said piston-cylinder assembly is operable independent of said member and coacts with said first and second abutments to increase the spacing between the first and second abutments to cause radial expansion of the brake shoe.

2. The drum brake assembly of claim 1, further comprising:

an extension on said first abutment;

wherein said piston-cylinder assembly coacts with said second abutment and said extension to thereby cause radial expansion of the brake shoe when operated independent of said composite structure.

3. The drum brake assembly of claim 1, further comprising:

operating means for moving said member, wherein said member is in the form of a lever, said reaction means is located at a first end portion of the member, said operating means is connected to said member at a second end portion of the member opposite said first end portion, and said piston-cylinder assembly is connected to said member between said first and second end portions.

4. The drum brake assembly of claim 1 wherein said piston-cylinder assembly extends through an opening in the backing plate without contacting said backing plate.

5. The drum brake assembly of claim 1 wherein said reaction means on said member coacts with said first abutment through a first pivot-like connection, and said piston-cylinder assembly coacts with said second abutment through a second pivot-like connection, and wherein the pivot axes of said first and second pivot-like connections extend in a direction substantially parallel to the axis of rotation of the brake drum.

6. The drum brake assembly of claim 1, further comprising:

a spring member connected to said backing plate and said piston-cylinder assembly, said spring member biasing said shoe ends toward said backing plate.

7. The drum brake assembly of claim 1, wherein said piston-cylinder assembly includes means for automatically adjusting its effective length to compensate for wear of an associated brake shoe.

8. The drum brake assembly of claim 7, wherein said adjusting means includes a screw threaded stud having a toothed wheel and a spring biased pawl coacting with said wheel, said stud being at the end of said piston-cylinder assembly adjacent said second abutment.

9. The drum brake assembly of claim 1, wherein said pivot axis extends in a direction such that said member moves generally in the direction of the longitudinal axis of said piston-cylinder assembly.

10. The drum brake assembly of claim 1, wherein said shoe includes a body formed as a single piece, to which friction lining is attached.

11. The drum brake assembly of claim 10, wherein said body is of channel shape in transverse cross-section, and each said abutment is formed by a respective radially inwardly bent end portion of the channel.

12. A drum brake assembly, comprising:

a backing plate;

a brake shoe attached to the backing plate and having two opposed and spaced ends, a first abutment at one end of the brake shoe and a second abutment at the other end of the brake shoe;

a primary brake actuator comprising a piston-cylinder assembly that is movably supported on the two ends of the brake shoe so that the piston-cylinder assembly may move relative to said backing plate, said piston cylinder assembly having a piston part and a cylinder part, each of which is operable to coact with a respective one of said abutments;

a secondary brake actuator comprising a member substantially fully contained in the brake assembly, said member having reaction means for coacting with said first abutment at an end portion thereof; and means connecting said member to one of said piston-cylinder assembly parts for relative movement about a pivot axis extending substantially parallel to the rotational axis of the brake drum, said pivot axis being spaced from said reaction means in a direction transverse to said pivot axis;

wherein in a first mode of operation of said brake assembly said one piston-cylinder assembly part and said member cooperate to form a composite structure, said reaction means coacting with the first abutment, and said one piston-cylinder assembly part coacting with the second abutment so that said composite structure is operable to increase the spacing between said first and second abutments to cause radial expansion of the brake shoe when said member is moved in a first direction about said pivot axis; and wherein in a second mode of operation said piston-cylinder assembly is operable independent of said member and coacts with said first and second abutments to increase the spacing between the first and second abutments to cause radial expansion of the brake shoe.

13. The drum brake assembly of claim 12, wherein said cylinder part forms said one part of the piston-cylinder assembly.

14. The drum brake assembly of claim 12, further comprising:

an extension on said first abutment;

wherein said piston-cylinder assembly coacts with said second abutment and said extension to thereby cause radial expansion of the brake shoe when operated independent of said composite structure.

15. The drum brake assembly of claim 12, further comprising:

operating means for moving said member, wherein said member is in the form of a lever, said reaction means is located at a first end portion of the member, said operating means is connected to said member at a second end portion of the member opposite said first end portion, and said one piston-cylinder assembly part is connected to said member between said first and second end portions.

16. The drum brake assembly of claim 12 wherein said piston-cylinder assembly extends through an opening in the backing plate without contacting said backing plate.

17. The drum brake assembly of claim 12 wherein said reaction means on said member coacts with said first abutment through a first pivot-like connection, and said one piston-cylinder assembly part coacts with said second abutment through a second pivot-like connection, and wherein the pivot axes of said first and second pivot-like connections extend in a direction substantially parallel to the axis of rotation of the brake drum.

18. The drum brake assembly of claim 12, further comprising:

a spring member connected to said backing plate and said piston-cylinder assembly, said spring member biasing said shoe ends toward said backing plate.

19. The drum brake assembly of claim 12, wherein said piston-cylinder assembly includes means for automatically adjusting its effective length to compensate for wear of an associated brake shoe.

20. The drum brake assembly of claim 19, wherein said adjusting means includes a screw threaded stud having a toothed wheel and a spring biased pawl coacting with said wheel, said stud being at the end of said piston-cylinder assembly adjacent said second abutment.

* * * * *